(12) United States Patent
Zhao et al.

(10) Patent No.: US 8,064,334 B2
(45) Date of Patent: Nov. 22, 2011

(54) METHOD FOR IMPLEMENTING INTERSECTING RING NETWORK WITH ARBITRARY TOPOLOGY, NODE AND INTERSECTING RING NETWORK

(75) Inventors: Liyao Zhao, Beijing (CN); Minghui Wang, Beijing (CN); Jianyong Song, Beijing (CN); Ju Wang, Beijing (CN)

(73) Assignee: Hangzhou H3C Technologies Co., Ltd., Hangzhou (CN)

( * ) Notice: Subject to any disclaimer, the term of this patent is extended or adjusted under 35 U.S.C. 154(b) by 384 days.

(21) Appl. No.: 12/407,579

(22) Filed: Mar. 19, 2009

(65) Prior Publication Data

US 2009/0262643 A1  Oct. 22, 2009

(30) Foreign Application Priority Data

Apr. 16, 2008 (CN) .......................... 2008 1 0092285

(51) Int. Cl.
*G01R 31/08* (2006.01)
(52) U.S. Cl. ........................................ 370/217; 370/406
(58) Field of Classification Search .......... 370/403–406, 370/241
See application file for complete search history.

(56) References Cited

U.S. PATENT DOCUMENTS

| | | | | |
|---|---|---|---|---|
| 6,658,013 | B1* | 12/2003 | de Boer et al. | 370/404 |
| 6,717,922 | B2* | 4/2004 | Kamat et al. | 370/258 |
| 6,766,482 | B1* | 7/2004 | Yip et al. | 714/717 |
| 7,046,622 | B2* | 5/2006 | Ying et al. | 370/222 |
| 7,065,039 | B2* | 6/2006 | Ying | 370/222 |
| 7,167,445 | B2* | 1/2007 | Gullicksen et al. | 370/224 |
| 7,167,648 | B2* | 1/2007 | Heinz et al. | 398/58 |
| 7,274,656 | B2* | 9/2007 | Lee et al. | 370/223 |
| 7,440,397 | B2* | 10/2008 | Tsurumi et al. | 370/222 |
| 7,512,140 | B2* | 3/2009 | Mutoh et al. | 370/404 |
| 7,532,634 | B2* | 5/2009 | Higashitaniguchi et al. | 370/404 |
| 7,545,735 | B1* | 6/2009 | Shabtay et al. | 370/217 |
| 7,778,162 | B2* | 8/2010 | Yu | 370/223 |

(Continued)

FOREIGN PATENT DOCUMENTS

EP  1 575 221  9/2005

(Continued)

OTHER PUBLICATIONS

Yuan et al., "A Rapid Protection Switching Method in Carrier Ethernet Ring Networks," *Proc. of SPIE*, 7137:713711-1-713711-8 (2008).

(Continued)

*Primary Examiner* — Ricky Ngo
*Assistant Examiner* — Ben Liu
(74) *Attorney, Agent, or Firm* — Marshall, Gerstein & Borun LLP

(57) ABSTRACT

The present invention discloses a method for implementing an intersecting ring network with arbitrary topology, node and an intersecting ring network. The method includes: intersecting multiple Ethernet rings to form the intersecting ring network with arbitrary topology, each Ethernet ring in the intersecting ring network comprising a master node and multiple transmission nodes; the master node of each Ethernet ring opening its primary port and blocking its secondary port during initial normal operation; and the master node of each Ethernet ring in the intersecting ring network performing fault detection and fault processing as well as fault recovery detection and fault recovery processing by using one of the two manners containing protocol message interaction and detection on links directly connected to the master node.

20 Claims, 3 Drawing Sheets

U.S. PATENT DOCUMENTS

| | | | |
|---|---|---|---|
| 7,898,942 B2 * | 3/2011 | Takagi et al. | 370/222 |
| 7,920,576 B2 * | 4/2011 | Sakauchi et al. | 370/400 |
| 2003/0012129 A1 * | 1/2003 | Lee et al. | 370/216 |
| 2003/0026272 A1 * | 2/2003 | Nagamine et al. | 370/403 |
| 2003/0117946 A1 * | 6/2003 | Fontana et al. | 370/216 |
| 2003/0118041 A1 * | 6/2003 | Fontana et al. | 370/404 |
| 2005/0207348 A1 * | 9/2005 | Tsurumi et al. | 370/241 |
| 2007/0104093 A1 * | 5/2007 | Li et al. | 370/223 |

FOREIGN PATENT DOCUMENTS

| | | |
|---|---|---|
| WO | WO 03/077459 | 9/2003 |

OTHER PUBLICATIONS

Partial European Search Report for Application No. 09157602, dated Jul. 29, 2009.

* cited by examiner

METHOD FOR IMPLEMENTING INTERSECTING RING NETWORK WITH ARBITRARY TOPOLOGY, NODE AND INTERSECTING RING NETWORK

FIELD OF THE INVENTION

The present invention relates to Ethernet technology, and especially relates to a method for implementing protection in an intersecting ring network with arbitrary topology, node and an intersecting ring network.

BACKGROUND OF THE INVENTION

At present, Ethernet ring is widespread and applied gradually. FIG. 1 is a schematic illustrating the structure of a single Ethernet ring. With reference to FIG. 1, a single Ethernet ring includes a master node and multiple transmission nodes, and the master node and transmission nodes are adapted to transmit service data on the Ethernet ring and fulfill various service functions.

As to a single Ethernet ring, Rapid Ring Protection Protocol (RRPP) can provide an effective protection mechanism at present. RRPP is a link layer protocol specially applied in an Ethernet ring. When the Ethernet ring is integrated, RRPP can prevent broadcast storm caused by a data ring; when a link on the Ethernet ring is broken, RRPP can rapidly start a backup link so as to guarantee the maximum connectivity of the Ethernet ring.

As shown in FIG. 1, according to RRPP protocol, when a single Ethernet ring is running normally, the master node only opens the primary port on one side for data messages, and blocks the secondary port on other side. In this way, the Ethernet ring is in a chain form in stead of forming a loop when transmitting the data messages.

According to RRPP protocol, in a single Ethernet ring, fault detection and fault processing include: a master node periodically sends a Hello message from its primary port; the master node determines that the Ethernet ring where it is located is down if the master node does not receive the Hello message sent by itself in a predefined period of time, or if the master node receives a fault notification message reported by a transmission node, or if the master node detects that a link directly connected to one of its ports is at fault; and the master node transfers to a down state, opens the blocked secondary port, and sends out a forward-table updating message. According to RRPP protocol, fault recovery detection and fault recovery processing include: a master node periodically sends a Hello message; after the Ethernet ring is down, if the master node can receive the Hello message it has sent, or if the master node receives a fault recovery message reported by a transmission node, or if the master node detects that a link directly connected to one of its ports is up, the master node determines that the Ethernet ring where it is located has recovered, opens the blocked secondary port and sends out a forward-table updating message.

In a single Ethernet ring, when the node of the Ethernet ring directly connected to the fault link detects that the fault has been eliminated, the node will firstly set the fault recovery port into a blocked state, and start a blocking timer. When the node receives a forward-table updating message sent by the master node or when the blocking timer is out, the node will transfer the port from the blocked state to a state of normally forwarding messages, so as to guarantee smoothness of the link.

With the development of services, a single Ethernet ring sometimes cannot meet the requirement of the services. In practical network application, it is usually needed to intersect multiple Ethernet rings arbitrarily to form an intersecting ring network. In other words, an intersecting ring network may include multiple Ethernet rings, each of the Ethernet rings corresponds to an Ethernet topology in form of ring connection, and the intersecting ring network is constituted by the multiple Ethernet rings intersected with one another. FIG. 2 is a schematic illustrating a topology structure formed by multiple intersected Ethernet rings. With reference to FIG. 2, Ethernet ring R1 (composed of S1, S2, S3 and S4), R2 (composed of S3, S2 and S6) and R3 (composed of S3, S2 and S5) are intersected to form an intersecting ring network with arbitrary topology.

The networking manner of intersecting multiple Ethernet rings can form a more flexible network topology structure, so as to provide richer services for users. Due to characteristics of Ethernet ring itself, as to the intersected Ethernet rings, an effective ring network protection mechanism is also needed to guarantee smoothness of links in the ring network and to avoid forming a loop. As shown in FIG. 2, it is not only needed to prevent Ethernet rings R1, R2 and R3 from forming a loop, but also needed to guarantee a big ring generated via intersection (like the ring formed by S1, S2, S6, S3, S4 and S1) from forming a loop. Further, it is needed to consider what kind of measures should be adopted when an Ethernet ring like R1 is down, so as to guarantee smoothness of the other Ethernet rings, and so forth.

However, at present, there is only effective Ethernet ring protection mechanism for a single Ethernet ring, but there is no effective ring network protection mechanism for an arbitrary topology formed by intersected multiple Ethernet rings.

SUMMARY

Embodiments of the present invention provide a method for implementing an intersecting ring network with arbitrary topology, node and an intersecting ring network, so as to provide an effective ring network protection mechanism for multiple intersected Ethernet rings with arbitrary topology.

Technical schemes of the present invention are implemented as follows.

A method for implementing protection in an intersecting ring network with arbitrary topology includes:

intersecting multiple Ethernet rings to form the intersecting ring network with arbitrary topology, each Ethernet ring in the intersecting ring network includes a master node and multiple transmission nodes;

the master node of each Ethernet ring opening its primary port and blocking its secondary port during initial normal operation; and the master node of each Ethernet ring in the intersecting ring network performing fault detection and fault processing as well as fault recovery detection and fault recovery processing by using one of the two manners containing protocol message interaction and detection on links directly connected to a port.

The method further includes: mapping each Ethernet ring in the intersecting ring network into a layer, the layer of the Ethernet ring being one of the layers from the most inner layer to the most outer layer; and protocol message interaction in the intersecting ring network includes:

a node of any Ethernet ring in the intersecting ring network sending out a protocol message carrying layer information of the Ethernet ring where the node is located;

a transmission node in the intersecting ring network forwarding the protocol message through other unblocked ports after receiving the protocol message from one port;

a master node in the intersecting ring network:

forwarding the protocol message through other unblocked ports when receiving the protocol message from an outer layer ring through an unblocked port; or performing relevant processing according to the protocol message and not forwarding the protocol message when receiving the protocol message from the current layer ring of the master node; or directly discarding the protocol message when receiving the protocol message from an inner layer ring.

The method further includes: mapping each Ethernet ring in the intersecting ring network into a layer, the layer of the Ethernet ring being one of the layers from the most inner layer to the most outer layer; setting layer information for each port of an edge node according to the Ethernet ring the port belongs to, the edge node being a node with a port through which a virtual node accesses an Ethernet ring in the intersecting ring network, wherein a network formed by all the inner layer rings of the Ethernet ring is taken as the virtual node of the Ethernet ring; and protocol message interaction in the intersecting ring network includes:

a node of any Ethernet ring in the intersecting ring network sending out a protocol message carrying layer information of the Ethernet ring where the node is located;

an edge node receiving the protocol message from one of its ports, selecting a port that is at the same layer as or on an inner layer than the layer indicated by the layer information carried in the protocol message, and forwarding the protocol message from the port.

The method further includes: mapping each Ethernet ring in the intersecting ring network into a layer, the layer of the Ethernet ring being one of the layers from the most inner layer to the most outer layer; and protocol message interaction in the intersecting ring network includes:

a transmission node of any Ethernet ring in the intersecting ring network directly discarding the protocol message when receiving the protocol message from an inner layer ring.

The method further includes: any node in the intersecting ring network forwarding protocol messages in preference to data messages according to the principle that priority of protocol messages is higher than that of data messages.

The protocol message is a fault notification message carrying layer information of the Ethernet ring where a transmission node is located, wherein the transmission node sends the fault notification message to the master node in the current layer ring when determining that a link directly connected to a port of the transmission node is at fault; and the process of the master node performing fault detection and fault processing by using protocol message interaction includes: when determining that the Ethernet ring where the master node is located has the same layer as the layer indicated by the layer information carried in the fault notification message, the master node in the intersecting ring network determining that the Ethernet ring where it is located is at fault, opening the secondary port and sending out an forward-table updating message.

The process of determining that a link directly connected to a port of the transmission node is at fault includes:

the transmission node determining that the link is at fault when determining that state of the port changes from normal to fault;

or when an adjacent node of the transmission node operates normally, sending a heartbeat message to the transmission node every time a preset sending timer is out and restarting the sending timer, and the transmission node starting a receiving timer, and determining that the link is at fault if no heartbeat message is received at the port connected to the adjacent node before the receiving timer is out;

or the transmission node sending a heartbeat message to its adjacent node every time a preset sending timer is out and starting a receiving timer, the adjacent node returning the heartbeat message to the transmission node when receiving the heartbeat message sent by the transmission node, and determining that the link is at fault if the transmission node does not receive the heartbeat message sent by itself from the port connected to the adjacent port before the receiving timer is out.

The process of the transmission node sending the fault notification message includes:

after detecting a fault on a link directly connected to a port of the transmission node, the transmission node blocking the port, sending a fault notification message carrying layer information of the Ethernet ring where it is located to the master node in the current layer ring, and starting a preset fault message sending timer;

every time the fault message sending timer is out, the transmission node sending a fault notification message carrying layer information of the Ethernet ring where it is located to the master node in the current layer ring and restarting the fault message sending timer; and the transmission node ending the process of sending a fault notification message and restarting the fault message sending timer after receiving a forward-table updating message sent by the master node in the current layer ring.

The protocol message is a Hello message periodically sent by a master node carrying layer information of the Ethernet ring where the master node is located; and the process of the master node performing fault recovery detection and fault recovery processing by using protocol message interaction includes: after receiving a Hello message sent by the master node itself carrying layer information of the Ethernet ring where the master node is located, the master node determining that a fault on the Ethernet ring where it is located is recovered, blocking the secondary port, and sending out a forward-table updating message carrying layer information of the Ethernet ring where it is located.

The protocol message includes one of the following:

a forward-table updating message that is sent by the master node after detecting a fault on the link directly connected to the primary port of the master node and that carries layer information of the Ethernet ring where the master node is located;

a forward-table updating message that carries layer information of the Ethernet ring where the master node is located, and is sent by the master node after receiving a fault notification message carrying layer information of the Ethernet ring where the master node is located;

a forward-table updating message that is sent by the master node after receiving a Hello message sent by the master node itself and that carries layer information of the Ethernet ring where the master node is located;

a forward-table updating message that carries layer information of the Ethernet ring where the master node is located, and is sent by the master node after determining that fault recovery messages, each of which carries layer information of the Ethernet ring where the master node is located, correspond to the same link are received from different ports of the master node belonging to the same layer ring.

The process of determining fault recovery messages corresponding to the same link includes:

determining different fault recovery messages that carry information of the same node as the fault recovery messages corresponding to the same link; or according to topology structure of the intersecting ring network obtained in advance, determining different fault recovery messages that carry information of two nodes on double ends of a link as the fault recovery messages corresponding to the same link.

The method further includes:

any node in the intersecting ring network receiving a forward-table updating message from a port that carries layer information, and updating the forward table of the port when the layer of the Ethernet ring the port belongs to is the same layer as or an inner layer than the layer indicated by the layer information carried in the forward-table updating message.

The method further includes:

a master node in the intersecting ring network executing fault protection processing including opening the secondary port and sending a forward-table updating message carrying layer information of the Ethernet ring where the master node is located only when one of the two following situations occur, wherein the two situations include receiving a fault notification message that carries layer information of the current layer ring of the master node, and detecting that a link directly connected to the primary port of the master node is at fault, and wherein the master node is a master node of any layer ring except the most inner layer ring or is a master node of any layer ring in the intersecting ring network;

and/or after a node in the intersecting ring network detecting that a link directly connected to its port belonging to any layer ring except the most inner layer ring is recovered, the node setting the port to be blocked, and opening the blocked port only when receiving a forward-table updating message sent by the master node of the current layer ring of the node.

An intersecting ring network with arbitrary topology includes:

multiple intersected Ethernet rings, each Ethernet ring in the intersecting ring network includes a master node and multiple transmission nodes, wherein the primary port of the master node is open and the secondary port of the master node is blocked during initial normal operation;

the master node of each Ethernet ring in the intersecting ring network is capable of performing fault detection and fault processing as well as fault recovery detection and fault recovery processing by using one of the two manners containing protocol message interaction and/or detection on links directly connected to the master node.

Each Ethernet ring in the intersecting ring network is mapped into a layer, and the layer of the Ethernet ring is one of the layers from the most inner layer to the most outer layer; and a node of any Ethernet ring in the intersecting ring network is capable of sending a protocol message carrying layer information of the node's current layer ring;

a transmission node in the intersecting ring network is capable of receiving the protocol message from a port, and forwarding the protocol message through other unblocked ports; and a master node in the intersecting ring network is capable of forwarding the protocol message through other unblocked ports when receiving the protocol message from an outer layer ring through an unblocked port, and capable of performing relevant processing according to the protocol message and not forwarding the protocol message anymore when receiving the protocol message from the current layer ring of the master node, and capable of directly discarding the protocol message when receiving the protocol message from an inner layer ring.

Each Ethernet ring in the intersecting ring network is mapped into a layer, and the layer of the Ethernet ring is one of the layers from the most inner layer to the most outer layer;

the intersecting ring network further includes an edge node, and the ports of the edge node belong to different layer rings, wherein the edge node is a node with a port through which a virtual node accesses an Ethernet ring and a network composed of all the inner layer rings of the Ethernet ring in the intersecting ring network is taken as the virtual node of the intersecting ring network; and a node of any layer ring in the intersecting ring network is capable of sending a protocol message carrying information of the current layer ring;

the edge node is capable of receiving the protocol message from one of its ports, selecting another port that is at the same layer as or on an inner layer than the layer indicated by the layer information carried in the protocol message, and forwarding the protocol message from the selected another port.

A master node located in an intersecting ring network with arbitrary topology includes:

a port processing unit, capable of receiving a protocol message carrying layer information from other nodes, and forwarding the protocol message carrying the layer information through other unblocked ports after receiving a forward notification message; and a protocol message processing unit, capable of obtaining layer information from the protocol message received by the port processing unit, directly discarding the protocol message if it is determined that the master code's node's current layer ring is an outer layer ring comparing with the layer information, and sending the forward notification message to the port processing unit if it is determined that the master code's node's current layer ring is an inner layer ring comparing with the layer information.

The port processing unit is further capable of sending protocol messages in preference to data messages according to the principle that priority of protocol messages is higher than that of data messages when forwarding the protocol message carrying layer information.

The protocol message processing unit is further capable of performing fault protection processing including opening the secondary port and sending a forward-table updating message carrying layer information of the current layer ring only when one of the two situations occur, wherein the two situations include receiving a fault notification message that carries layer information of the current layer ring, and detecting that a link directly connected to the primary port is at fault.

A transmission node located in an intersecting ring network with arbitrary topology and acts as an edge node, wherein the edge node is a node with a port through which a virtual node accesses an Ethernet ring and a network composed of all the inner layer rings of the Ethernet ring is taken as the virtual node of the intersecting ring network;

the transmission node includes:

a port control unit, capable of receiving from a first port a protocol message that carries layer information and is sent by other nodes, forwarding the protocol message carrying layer information through a port corresponding to the port information carried in a forward notification after receiving the forward notification; and a protocol message control unit, capable of obtaining layer information from the protocol message received by the port control unit, selecting a port that belongs to a layer ring that is the same layer ring as or an inner layer ring than the layer indicated by the layer information carried in the protocol message from the ports of the transmission node other than the first port, and sending the forward notification that carries information of the selected port to the port control unit.

The port control unit is further capable of sending protocol messages in preference to data messages according to the principle that priority of protocol messages is higher than that of data messages when forwarding the protocol message carrying layer information.

The port control unit is further capable of setting a port to a blocked state after detecting that a link directly connected to the port belonging to any layer ring except the most inner layer ring is recovered, and opening the blocked port only when receiving a forward-table updating message sent by the master node of the current layer ring of the transmission node.

Thus, it can be seen that in the present invention, a protocol message of an Ethernet ring is confined to be transmitted only at the current layer ring or on an inner layer ring. Hence, it is guaranteed that each Ethernet ring can perform fault protection processing starting from the most inner layer ring and outwards layer by layer, so as to provide an effective ring network protection mechanism for multiple intersected Ethernet rings with arbitrary topology when performing fault detection upon the Ethernet ring by way of protocol message.

Preferably, in the present invention, the master node of an Ethernet ring other than the most inner layer ring does not utilize a Hello message to check if the Ethernet ring is at fault, and before determining that an Ethernet ring is at fault, the master node on the single Ethernet ring does not open the secondary port anymore even if no Hello message is received when a timer is out. Therefore, when the most inner layer ring and an outer layer ring are both at fault, a loop path caused by opening of the secondary port by the master node of the outer layer ring will be avoided. Besides, in the present invention, after a transmission node of an Ethernet ring other than the most inner layer ring sets a port of the Ethernet ring as blocked, the process of starting a blocking timer and moving the port's state from blocked to normal forwarding state when the blocking timer is out is not executed anymore. In this way, a loop path caused by moving of the state of the port on the transmission node of the outer layer ring to a normal forwarding state, when faults on the most inner layer ring and the outer layer ring are recovered, will be avoided.

EMBODIMENTS OF THE INVENTION

To make objects, technical scheme and merits of the present invention clearer, the present invention will be further described in detail hereinafter with reference to the drawings and specific embodiments.

The present invention discloses a method for implementing an intersecting ring network with arbitrary topology. The method includes: intersecting multiple Ethernet rings to form the intersecting ring network with arbitrary topology, each Ethernet ring in the intersecting ring network includes a master node and multiple transmission nodes; the master node of each Ethernet ring opening its primary port and blocking its secondary port during initial normal operation; and the master node of each Ethernet ring in the intersecting ring network performing fault detection and fault processing as well as fault recovery detection and fault recovery processing by using one of the two manners containing protocol message interaction and detection on links directly connected to the master node.

Figure 1:
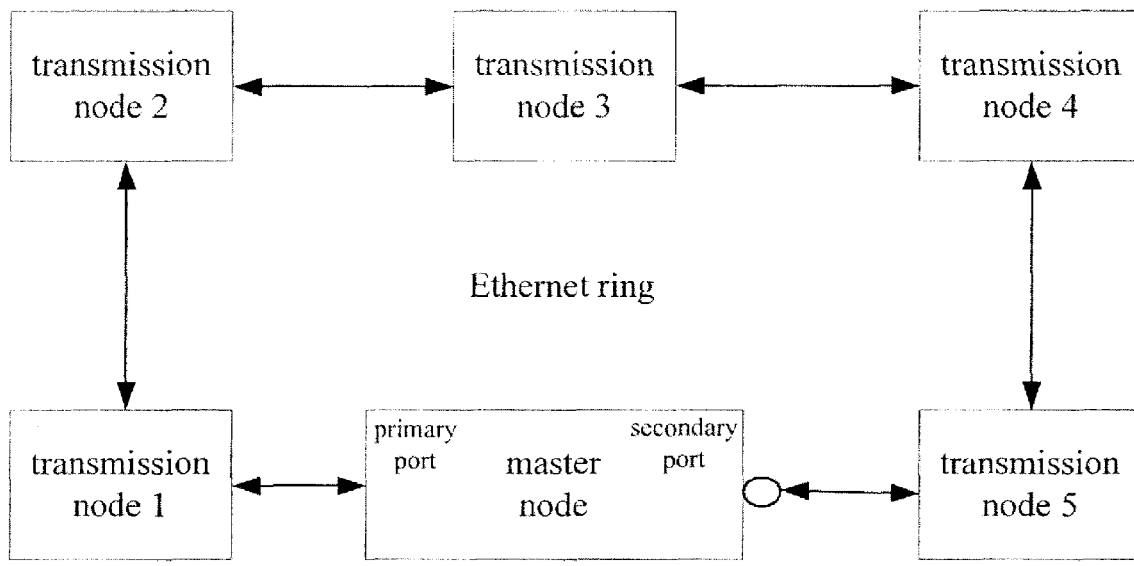
FIG. 1 is a schematic illustrating the structure of a single Ethernet ring.
Figure 2:
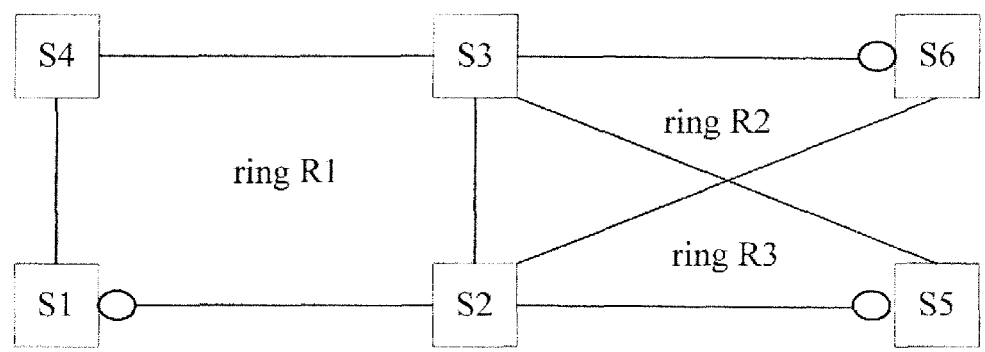
FIG. 2 is a schematic illustrating a topology structure formed by multiple intersected Ethernet rings.

In the present invention, for the convenience of management, each Ethernet ring in the intersecting ring network can be defined as a layer, and the layer is one of the layers starting from the most inner layer and defined outwards layer by layer. That is, each Ethernet ring in the intersecting ring network is mapped into a layer, and the layer of each of the Ethernet rings is one of the layers from the most inner layer to the most outer layer. During the process of defining each Ethernet ring in the intersecting ring network into each of the layers, wherein the layers are starting from the most inner layer and defined outwards layer by layer, the Ethernet ring that is located at the core or convergence layer can be set as the most inner layer. With reference to the structure formed by three intersected Ethernet rings shown in FIG. 2, Ethernet ring R1 can be set as the most inner layer ring, while Ethernet ring R2 and R3 can be set as a next outer layer ring and the most outer layer ring, respectively. During initial normal operation, S1 is the master node of the most inner layer ring R1. During initial normal operation, master nodes of Ethernet rings R1, R2 and R3 all open their primary ports and block their secondary ports.

In embodiments of the present invention, the protocol message can be any kind of protocol messages in a single Ethernet ring, such as a fault notification message, a Hello message, a forward-table updating message and so on.

The first example is using a fault notification message as the protocol message. It will be illustrated in detail hereinafter how to transmit the fault notification message in the intersecting ring network, as well as relevant processing according to the fault notification message.

Figure 3:
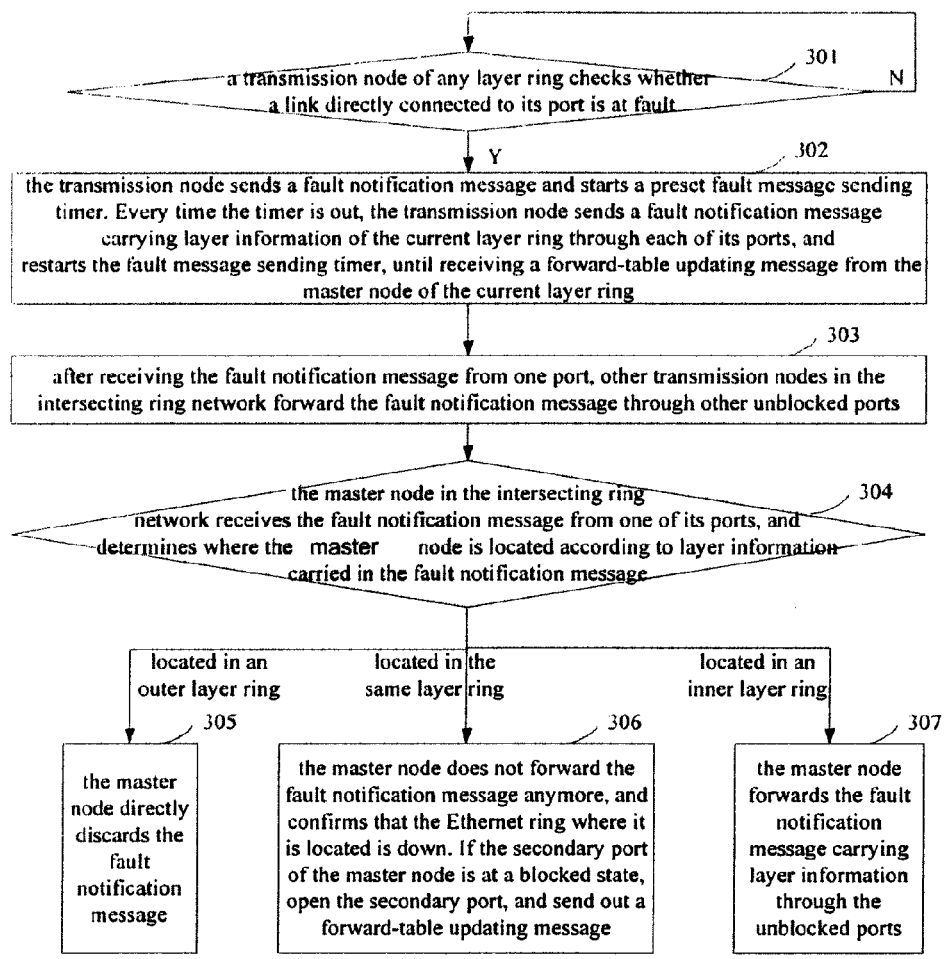
FIG. 3 is a flowchart illustrating the procedure of sending and processing a fault notification message in the intersecting ring network in an embodiment of the present invention.

FIG. 3 is a flowchart illustrating the procedure of sending and processing a fault notification message in the intersecting ring network in an embodiment of the present invention. With reference to FIG. 3, the procedure specifically includes the following steps.

Step 301: in the intersecting ring network, a transmission node of any layer ring checks whether a link directly connected to its port is at fault, and if yes, forward to step 302, otherwise, return to step 301.

In step 301, there may be two manners for a transmission node of any layer ring to implement the check if a link directly connected to a port of the transmission node is at fault.

Manner 1: the transmission node checks if the state of the port turns from UP to DOWN, and if yes, it is determined that the link directly connected to the port is down.

Manner 2: the transmission node checks the fault by receiving and sending a heartbeat message.

Specifically, there are two kinds of processes for implementing manner 2.

Process 1: an adjacent node of any transmission node in the intersecting ring network starts a preset sending timer. Every time the sending timer is out, the adjacent node sends a heartbeat message to its adjacent transmission node and restarts the sending timer. The transmission node starts a preset receiving timer, determines whether a heartbeat message can be received from a port connected to the adjacent node before the receiving timer is out, and if the heartbeat message can not be received, block the port; if yes, restart the receiving timer.

Process 2: every time a preset sending timer is out, any transmission node in the intersecting ring network sends a heartbeat message to its adjacent node and starts the receiving timer. If the adjacent node receives the heartbeat message sent by the transmission node, it will return a heartbeat message to the transmission node. If the transmission node does not receive the heartbeat message from a port connected to the adjacent node before the receiving timer is out, it confirms that a link directly connected to the port is at fault and will block the port.

Step 302: the transmission node sends a fault notification message carrying layer information of the Ethernet ring where it is located to the master node of the current layer ring, and starts a preset fault message sending timer. Every time the fault message sending timer is out, the transmission node sends a fault notification message carrying layer information of the transmission node's current layer ring through each of its ports, and then restarts the fault message sending timer, until receiving a forward-table updating message from the master node of the current layer ring.

Step 303: after another transmission node in the intersecting ring network receives the fault notification message from one of its unblocked ports, the another transmission node forwards the fault notification message through its other unblocked ports.

Step 304: the master node in the intersecting ring network receives the fault notification message from one of its ports, and determines according to layer information carried in the fault notification message whether the master node is located in the same layer ring as, or an outer or inner layer ring than the layer indicated in the carried information. If it's an outer layer ring, forward to step 305; if it's the same layer ring, forward to step 306; if it's an inner layer ring, forward to step 307.

Step 305: the master node directly discards the fault notification message, and ends the procedure.

Step 306: the master node does not forward the fault notification message anymore, and confirms that the Ethernet ring where it is located is down. If the secondary port of the master node is at a blocked state, open the secondary port, send out a forward-table updating message, and end the procedure.

Step 307: if there are still other unblocked ports, the master node forwards the fault notification message carrying layer information through the unblocked ports.

In the above-mentioned steps 304 to 307, by means of layer comparison performed in the master node, it is controlled that the fault notification message sent by the master node is transmitted only at the current layer ring or within inner layer rings of the master node. In practical service implementations, other means can also be applied for controlling the fault notification message sent by the master node to be transmitted only at the current layer ring or within inner layer rings. For example, one of the applicable means includes: setting an edge node, and setting layer information for each port of the edge node according to the Ethernet ring the port belongs to.

The edge node is a node with a port through which a virtual node accesses the Ethernet ring, wherein a network formed by all inner layer rings of the Ethernet ring in the intersecting ring network is taken as the virtual node. Hence, after receiving the fault notification message from one of its ports, the edge node selects a port that is at the same layer as or on an inner layer than the layer indicated by the layer information carried in the fault notification message from other ports, and forwards the fault notification message from the selected port. For another example, another applicable means includes: after receiving a fault notification message from an inner layer ring of an Ethernet ring of any layer in the intersecting ring network, a transmission node in the Ethernet ring directly discards the fault notification message.

According to the processing upon a fault notification message provided in the embodiment, only the Ethernet ring where the node generating the message is located (i.e., the current layer ring of the node) and inner layer rings of the node can forward the fault notification message. Moreover, fault protection processing is performed by the master node of the Ethernet ring where the node is located. In this way, a fault protection mechanism in the intersecting ring network is provided, so that no loop will occur in the intersecting ring network, and smoothness of the ring network is guaranteed to the maximum.

In the next example, a Hello message is taken as the protocol message. It will be illustrated how to transmit the Hello message in the intersecting ring network, as well as relevant processing according to the Hello message.

In this embodiment, the processing upon a Hello message on each layer ring in the intersecting ring network is different from that of a single Ethernet ring.

Figure 4:
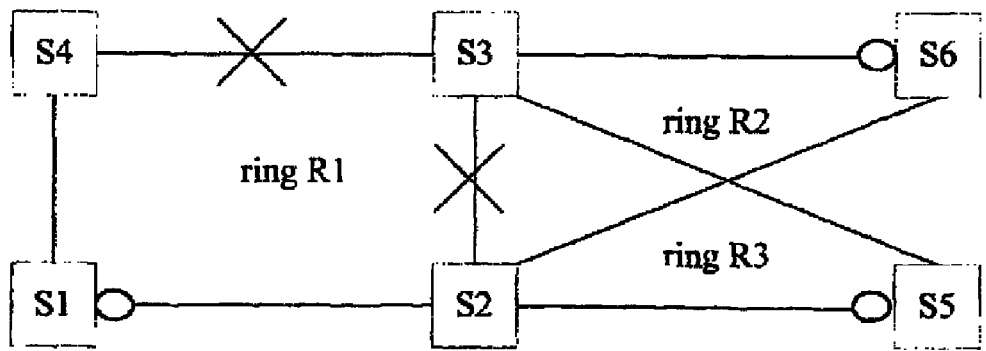
FIG. 4 is a schematic illustrating the occurrence of two faults in the intersecting ring network.
Figure 5:
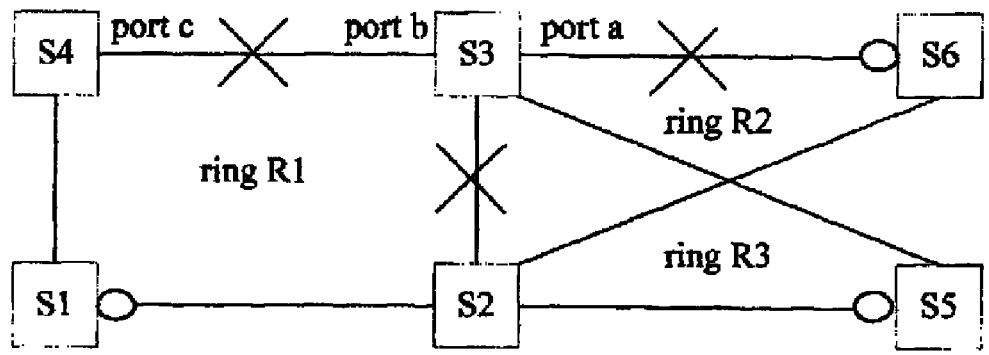
FIG. 5 is a schematic illustrating the occurrence of three faults in the intersecting ring network.

As to single ring processing in the existing technology, the master node can check whether the Ethernet ring where it is located is down or recovered to an up state according to the Hello message. As to an intersecting ring network with arbitrary topology constituted by multiple intersected Ethernet rings, not only the single ring processing is taken into consideration, but also the effect of each ring's processing upon other rings should be considered. Therefore, as to the intersecting ring network, the master node of each Ethernet ring cannot simply adopt the single ring processing on the Hello message in the existing technology, and otherwise, it will lead to a loop in the intersecting ring network. A specific example will be given to illustrate the situation. Two faults occur in the intersecting ring network shown in FIG. 4, including a fault between node S2 and S3 as well as a fault between node S3 and S4. As to Ethernet ring R1 (composed of node S1, S2, S3 and S4), Ethernet ring R2 (composed of node S2, S3 and S6) and Ethernet ring R3 (composed of node S2, S3 and S5), the master nodes S1, S6 and S5 at a normal state cannot receive a Hello message sent by themselves, respectively. According to the single ring processing in the existing technology, the master nodes S1, S6 and S5 of Ethernet rings R1, R2 and R3 will all confirm that their current layer rings are down, and will all move their own states to down and open their secondary ports. In this way, since the master nodes of Ethernet rings R1, R2 and R3 have all opened their secondary ports, a loop appears in the intersecting ring network, like the ring formed by S3, S6, S2, S5 and S3.

Thus, it can be seen that in the intersecting ring network, processing upon a Hello message cannot simply adopt the single ring processing in the existing technology. In order to prevent a loop path from occurring, the processing upon the Hello message in the present invention includes: in the intersecting ring network, the master node only adopts the Hello message to check whether the Ethernet ring is recovered from a fault, and does not adopt the Hello message to check whether the Ethernet ring is down; and a fault protection processing to be performed when a timer is out and no Hello message is received is cancelled, wherein the fault protection processing includes opening the secondary port and sending a forward-table updating message. In other words, the master node detects a fault only when the transmission node reports a fault notification or via detecting links directly connected to the primary port. Namely, only when the master node receives a fault notification message carrying information of the current layer ring or detects a fault on a link directly connected to the primary port, does the master node execute the fault protection processing including opening the secondary port and sending a forward-table updating message carrying information of the current layer ring. It can be the master node of an Ethernet ring other than the most inner layer ring to adopt the above-mentioned processing upon a Hello message, or the master node of any layer ring in the intersecting ring network to adopt the above-mentioned processing upon a Hello message.

Thus, it can be concluded that the procedure of transmitting Hello message introduced in the embodiment of the present invention includes: sending by the master node in the intersecting ring network the Hello message carrying layer information of the current layer ring of the master node periodically. As to the Hello message, transmission of the message is also confined within the current layer ring and inner layer rings, and specific implementation includes the following three applicable processes:

Process 1: a master node of any layer ring in the intersecting ring network periodically sends a Hello message carrying layer information of the current layer ring; after receiving the Hello message from a port, a transmission node in the intersecting ring network forwards the message through other unblocked ports; any of the other master nodes in the intersecting ring network receives the Hello message through unblocked ports, and if it is confirmed according to layer information carried in the Hello message that the current layer ring of the master node is an outer layer ring, the master node directly discards the Hello message, if it is confirmed according to layer information carried in the Hello message that the current layer ring of the master node is the same layer ring as the layer indicated by the layer information, the master node does not forward the Hello message anymore, if it is confirmed according to layer information carried in the Hello message that the current layer ring of the master node is an inner layer ring, the master node forwards the Hello message through other unblocked ports.

Process 2: setting an edge node in the intersecting ring network and setting layer information for each port of the edge node according to the Ethernet ring the port belongs to, wherein the edge node is a node with a port through which a virtual node accesses the Ethernet ring, and a network composed of all the inner layer rings of the Ethernet ring in the intersecting ring network is taken as the virtual node of the intersecting ring network; the master node of any layer ring in the intersecting ring network sends periodically a Hello message carrying layer information of the current layer ring after confirming that the current layer ring is down; after receiving the Hello message from one of its ports, the edge node selects one or more ports belonging to the same layer as or an inner layer than the layer indicated by the layer information carried in the Hello message from its other ports, and forwards the Hello message from the selected ports.

Process 3: after receiving a Hello message from an inner layer ring, a transmission node of any layer ring in the intersecting ring network directly discards the Hello message.

After finishing transmitting the Hello message that is utilized by the master node to detect whether the Ethernet ring is recovered by way of any process mentioned above, if the master node receives the Hello message carrying layer information of the current layer ring transmitted by the master node itself, it confirms that the current layer ring is recovered from fault, blocks the secondary port, and sends a forward-table updating message that carries layer information of the current layer ring.

At last, take a forward-table updating message as the protocol message for example. It is introduced in detail how to transmit the forward-table updating message in the intersecting ring network, as well as relevant processing performed according to the forward-table updating message. As to the forward-table updating message, it is also transmitted merely within the current layer ring and inner layer rings, and specific implementation includes the following three applicable processes.

Process A: after a master node of any layer ring in the intersecting ring network confirms that the Ethernet ring where it is located is down, it periodically sends a forward-table updating message carrying layer information of the Ethernet ring where it is located; after receiving the forward-table updating message from a port, a transmission node in the intersecting ring network forwards the message through other normal ports; any of the other master nodes in the intersecting ring network receives the forward-table updating message from other unblocked ports, and if it is confirmed according to layer information carried in the forward-table updating message that the current layer ring of the master node is an outer layer ring, the master node directly discards the forward-table updating message, if it is confirmed according to layer information carried in the Hello message that the current layer ring of the master node is the same layer ring or an inner layer ring, the master node forwards the forward-table updating message through other unblocked ports.

Process B: setting an edge node in the intersecting ring network and setting layer information for each port of the edge node according to the Ethernet ring the port belongs to, wherein the edge node is a node with a port through which a virtual node accesses the Ethernet ring, and a network composed of all the inner layer rings of the Ethernet ring is taken as the virtual node of the intersecting ring network; after determining that the current layer ring is down, the master node of any layer ring in the intersecting ring network periodically sends a forward-table updating message carrying layer information of the current layer ring; after receiving the forward-table updating message from one of its ports, the edge node selects one or more ports that are at the same layer as or on an inner layer than the layer indicated by the layer information carried in the forward-table updating message from its other ports, and forwards the forward-table updating message from the selected ports.

Process C: after receiving a forward-table updating message from an inner layer ring, a transmission node of any layer ring in the intersecting ring network directly discards the forward-table updating message.

In the present embodiment, the forward-table updating message may be a forward-table updating message that carries layer information of the master node's current layer ring and that is sent by the master node after detecting a fault on the link directly connected to the primary port; or a forward-table updating message that carries layer information of the master node's current layer ring and that is sent by the master node after receiving the fault notification message carrying layer information of the master node's current layer ring; or a forward-table updating message that carries layer information of the master node's current layer ring and that is sent by the master node after receiving a Hello message sent by the master node itself; or a forward-table updating message that carries layer information of the master node's current layer ring and that is sent by the master node after the master node receives fault recovery messages from different ports belonging to the same layer ring, wherein each of the fault recovery messages carries layer information of the master node's current layer ring and the fault recovery messages correspond to the same link.

Here, the process of determining fault recovery messages corresponding to the same link includes: determining different fault recovery messages that carry information of the same node (such as a node address) as the fault recovery messages corresponding to the same link; or, according to topology structure of the Ethernet ring network obtained in advance, determining different fault recovery messages that carry information of two nodes on double ends of a link as the fault recovery messages corresponding to the same link.

If the forward-table updating message is the one carrying layer information of the current layer ring, which is sent by the master node after the master node receives a fault recovery message carrying layer information of the Ethernet ring where it is located, it can be concluded that, in the Ethernet ring where the master node is located, there must be a transmission node that detects fault recovery of one of its links directly connected to its port. The fault recovery may be the node's detecting change of the port's state from down to up; or the node's receiving a heartbeat message sent by an adjacent node connected to the port. Afterwards, the transmission node will certainly set state of the port recovered from a fault as blocked.

In the single ring processing of the existing technology, after setting the state of the port as blocked, the transmission node will start a blocking timer. When the transmission node receives a forward-table updating message sent from the master node or when the blocking timer is out, the transmission node will reset the state of the port from blocked to a state of normally transmitting message.

Figure 6:
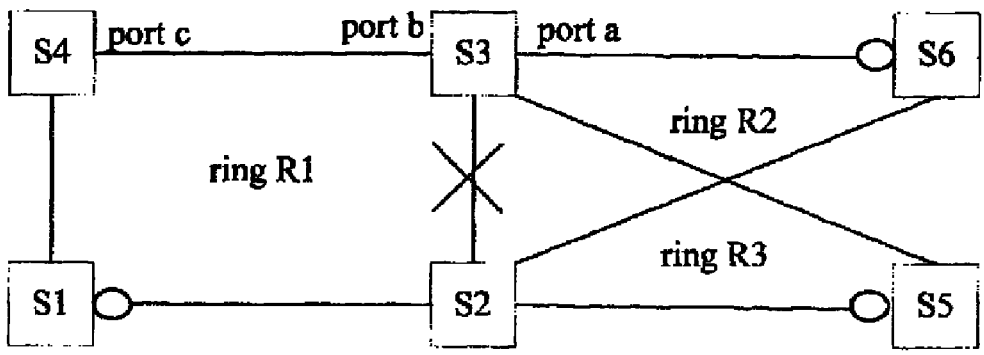
FIG. 6 is a schematic illustrating the occurrence of three faults when two of the faults are recovered in the intersecting ring network.

As to an intersecting ring network with arbitrary topology composed of multiple Ethernet rings, not only processing of single ring itself should be taken into consideration, but also effect of each Ethernet ring's processing upon other rings should be taken into consideration. Therefore, as to the intersecting ring network, a transmission node of each ring cannot simply adopt the way how a single ring's transmission node processes the blocked ports in the existing technology. Otherwise, it will lead to a loop path in the intersecting ring network. A specific example will be given to illustrate the situation. Three faults occur on the intersecting ring network shown in FIG. 4, including a fault between nodes S2 and S3, a fault between nodes S3 and S6 as well as a fault between nodes S3 and S4. As to the three faults, the master nodes of ring R1 and ring R2 will both open their own secondary ports. After that, the fault between nodes S3 and S6 in ring R2 is recovered first. After detecting the fault recovery, transmission node S3 of ring R2 sets the state of directly connected port as blocked, and starts the blocking timer. Since the fault between S2 and S3 as well as the fault between S3 and S4 still exist, the Hello message sent by the master node of R2, which is used for detecting if the Ethernet ring is recovered, cannot be received by master node S6 of ring R2. Hence, the secondary port of master node S6 of R2 is still opened, and S6 will not send out a forward-table updating message. Accordingly, node S3 will not receive the forward-table updating message when the blocking timer is out. According to single ring processing in the existing technology, node S3 will open the blocked port when the blocking timer is out, namely, set the state of the port to normal forwarding state. Thereafter, the fault between nodes S3 and S4 in ring R1 is also recovered, and port b and port c are finally set to normal forwarding state. Since the fault between node S2 and node S3 is not recovered yet, the secondary port of master node S1 in ring R1 is still opened. However, with reference to FIG. 6, a loop path occurs in the intersecting ring network at this moment, namely the ring formed by S1, S4, S3, S6, S2 and S1 appears.

Thus, it can be seen that in an intersecting ring network, a transmission node's processing upon the blocked port cannot simply adopt the single ring processing in the existing technology. In order to avoid a loop path from occurring, the processing provided by an embodiment of the present invention includes: in the intersecting ring network, a transmission node processes the blocked port belonging to the most inner layer ring by adopting the single ring processing manner in the existing technology; after setting the state of a port of an Ethernet ring other than the most inner layer ring to be blocked, the transmission node on the Ethernet ring may set the state of the blocked port to normal forwarding state only after receiving a forward-table updating message sent by the master node of the current layer ring, and there is no such processing as starting the blocking timer anymore, and/or there is no such processing as setting the port of the ring other than the most inner layer ring back to normal forwarding state anymore after the blocking timer is out.

To be clarified, in the present invention, when any node in the intersecting ring network forwards a protocol message, the node must abide by the principle that priority of protocol messages is higher than that of data messages, and send the protocol message in preference.

Furthermore, in an intersecting ring network, as to a protocol message such as a Hello message or a fault notification message, when transmitted on the current layer ring, the node receiving the message needs to report the message to CPU for processing, and the message is processed in the same way as the single ring processing in the existing technology, and when transmitted on an inner layer ring, the node receiving the message directly forwards the message without processing the message at all. As to a protocol message such as a forward-table updating message, when transmitted on the current layer ring and inner layer rings, all the nodes receiving the message need to process the message, and the processing may be implemented as follows: in the intersecting ring work, when any node receives a forward-table updating message carrying layer information from a port, if the layer ring that the port is preconfigured to belong to is the same layer as or an inner layer than the layer indicated by the layer information carried in the protocol message, the node updates the port's forward table, which is the same as the single ring processing in the existing technology.

In addition, an intersecting ring network with arbitrary topology is presented in an embodiment of the present invention. The intersecting ring network includes multiple intersected Ethernet rings, each Ethernet ring in the intersecting ring network including a master node and multiple transmission nodes, wherein the primary port of the master node is open and the secondary port of the master node is blocked during initial normal operation;

the master node of each Ethernet ring in the intersecting ring network is capable of performing fault detection and fault processing as well as fault recovery detection and fault recovery processing by using one of the two manners containing protocol message interaction and/or detection on links directly connected to the master node.

Each Ethernet ring in the intersecting ring network is mapped into a layer, and the layer of the Ethernet ring is one of the layers from the most inner layer to the most outer layer; and a node of any Ethernet ring in the intersecting ring network is capable of sending a protocol message carrying layer information of the node's current layer ring;

a transmission node in the intersecting ring network is capable of receiving the protocol message from a port, and forwarding the protocol message through other unblocked ports; and a master node in the intersecting ring network is capable of forwarding the protocol message through other unblocked ports when receiving the protocol message from an outer layer ring through an unblocked port, and capable of performing relevant processing according to the protocol message and not forwarding the protocol message anymore when receiving the protocol message from the current layer ring of the master node, and capable of directly discarding the protocol message when receiving the protocol message from an inner layer ring.

Each Ethernet ring in the intersecting ring network is mapped into a layer, and the layer of the Ethernet ring is one of the layers from the most inner layer to the most outer layer;

the intersecting ring network further includes an edge node, and the ports of the edge node belong to different layer rings, wherein the edge node is a node with a port through which a virtual node accesses an Ethernet ring and a network composed of all the inner layer rings of the Ethernet ring in the intersecting ring network is taken as the virtual node of the intersecting ring network; and a node of any layer ring in the intersecting ring network is capable of sending a protocol message carrying information of the current layer ring;

the edge node is capable of receiving the protocol message from one of its ports, selecting another port that is at the same layer as or on an inner layer than the layer indicated by the layer information carried in the protocol message, and forwarding the protocol message from the selected another port.

A master node located in an intersecting ring network with arbitrary topology is also presented in an embodiment of the present invention. The master node includes:

a port processing unit, capable of receiving a protocol message carrying layer information from other nodes, and forwarding the protocol message carrying the layer information through other unblocked ports after receiving a forward notification message; and a protocol message processing unit, capable of obtaining layer information from the protocol message received by the port processing unit, directly discarding the protocol message if it is determined that the master code's node's current layer ring is an outer layer ring comparing with the layer information, and sending the forward notification message to the port processing unit if it is determined that the master code's node's current layer ring is an inner layer ring comparing with the layer information.

The port processing unit is further capable of sending protocol messages in preference to data messages according to the principle that priority of protocol messages is higher than that of data messages when forwarding the protocol message carrying layer information.

The protocol message processing unit is further capable of performing fault protection processing including opening the secondary port and sending a forward-table updating message carrying layer information of the current layer ring only when one of the two situations occur, wherein the two situations include receiving a fault notification message that carries layer information of the current layer ring, and detecting that a link directly connected to the primary port is at fault.

A transmission node located in an intersecting ring network with arbitrary topology and acts as an edge node is also presented in an embodiment of the present invention. The edge node is a node with a port through which a virtual node accesses an Ethernet ring and a network composed of all the inner layer rings of the Ethernet ring is taken as the virtual node of the intersecting ring network.

The transmission node includes:

a port control unit, capable of receiving from a first port a protocol message that carries layer information and is sent by other nodes, forwarding the protocol message carrying layer information through a port corresponding to the port information carried in a forward notification after receiving the forward notification; and a protocol message control unit, capable of obtaining layer information from the protocol message received by the port control unit, selecting a port that belongs to a layer ring that is the same layer ring as or an inner layer ring than the layer indicated by the layer information carried in the protocol message from the ports of the transmission node other than the first port, and sending the forward notification that carries information of the selected port to the port control unit.

The port control unit is further capable of sending protocol messages in preference to data messages according to the principle that priority of protocol messages is higher than that of data messages when forwarding the protocol message carrying layer information.

The port control unit is further capable of setting a port to a blocked state after detecting that a link directly connected to the port belonging to any layer ring except the most inner layer ring is recovered, and opening the blocked port only when receiving a forward-table updating message sent by the master node of the current layer ring of the transmission node.

To sum up, the above illustrations are just preferable embodiments of the present invention and not used to confine the present invention. Any modification, equivalent substitute and improvement within spirit of the present invention are within the protection scope of the present invention.

The invention claimed is:

1. A method for implementing an intersecting ring network with arbitrary topology, comprising:

intersecting multiple Ethernet rings to form the intersecting ring network with arbitrary topology, mapping each Ethernet ring in the intersecting ring network into a layer, the layer of the Ethernet ring being one of the layers from the most inner layer to the most outer layer; and each Ethernet ring in the intersecting ring network comprising a master node and multiple transmission nodes;

the master node of each Ethernet ring opening its primary port and blocking its secondary port during initial normal operation; and the master node of each Ethernet ring in the intersecting ring network performing fault detection and fault processing as well as fault recovery detection and fault recovery processing by using one of the two manners containing protocol message interaction and detection on links directly connected to a port, wherein the protocol message interaction in the intersecting ring network comprises, a node of any Ethernet ring in the intersecting ring network sending out a protocol message carrying layer information of the Ethernet ring where the node is located, a transmission node in the intersecting ring network forwarding the protocol message through other unblocked ports after receiving the protocol message from one port, and a master node in the intersecting ring network,
- forwarding the protocol message through other unblocked ports when receiving the protocol message from an outer layer ring through an unblocked port, or
- performing relevant processing according to the protocol message and not forwarding the protocol message when receiving the protocol message from the current layer ring of the master node, or
- directly discarding the protocol message when receiving the protocol message from an inner layer ring.

2. The method according to claim 1, further comprising:
mapping each Ethernet ring in the intersecting ring network into a layer, the layer of the Ethernet ring being one of the layers from the most inner layer to the most outer layer;

setting layer information for each port of an edge node according to the Ethernet ring the port belongs to, the edge node being a node with a port through which a virtual node accesses an Ethernet ring in the intersecting ring network, wherein a network formed by all the inner layer rings of the Ethernet ring is taken as the virtual node of the Ethernet ring; and protocol message interaction in the intersecting ring network comprising, a node of any Ethernet ring in the intersecting ring network sending out a protocol message carrying layer information of the Ethernet ring where the node is located, and an edge node receiving the protocol message from one of its ports, selecting a port that is at the same layer as or on an inner layer than the layer indicated by the layer information carried in the protocol message, and forwarding the protocol message from the port.

3. The method according to claim 1, further comprising:
mapping each Ethernet ring in the intersecting ring network into a layer, the layer of the Ethernet ring being one of the layers from the most inner layer to the most outer layer; and protocol message interaction in the intersecting ring network comprising a transmission node of any Ethernet ring in the intersecting ring network directly discarding the protocol message when receiving the protocol message from an inner layer ring.

4. The method according to claim 1, further comprising: any node in the intersecting ring network forwarding protocol messages in preference to data messages according to the principle that priority of protocol messages is higher than that of data messages.

5. The method according to claim 1, wherein the protocol message is a fault notification message carrying layer information of the Ethernet ring where a transmission node is located, wherein the transmission node sends the fault notification message to the master node in the current layer ring when determining that a link directly connected to a port of the transmission node is at fault; and the process of the master node performing fault detection and fault processing by using protocol message interaction comprises when determining that the Ethernet ring where the master node is located has the same layer as the layer indicated by the layer information carried in the fault notification message, the master node in the intersecting ring network determining that the Ethernet ring where it is located is at fault, opening the secondary port and sending out an forward-table updating message.

6. The method according to claim 5, wherein the process of determining that a link directly connected to a port of the transmission node is at fault comprises:

the transmission node determining that the link is at fault when determining that state of the port changes from normal to fault;

or when an adjacent node of the transmission node operates normally, sending a heartbeat message to the transmission node every time a preset sending timer is out and restarting the sending timer, and the transmission node starting a receiving timer, and determining that the link is at fault if no heartbeat message is received at the port connected to the adjacent node before the receiving timer is out;

or the transmission node sending a heartbeat message to its adjacent node every time a preset sending timer is out and starting a receiving timer, the adjacent node returning the heartbeat message to the transmission node when receiving the heartbeat message sent by the transmission node, and determining that the link is at fault if the transmission node does not receive the heartbeat message sent by itself from the port connected to the adjacent port before the receiving timer is out.

7. The method according to claim 5, wherein the process of the transmission node sending the fault notification message comprises:

after detecting a fault on a link directly connected to a port of the transmission node, the transmission node blocking the port, sending a fault notification message carrying layer information of the Ethernet ring where it is located to the master node in the current layer ring, and starting a preset fault message sending timer;

every time the fault message sending timer is out, the transmission node sending a fault notification message carrying layer information of the Ethernet ring where it is located to the master node in the current layer ring and restarting the fault message sending timer; and the transmission node ending the process of sending a fault notification message and restarting the fault message sending timer after receiving a forward-table updating message sent by the master node in the current layer ring.

8. The method according to claim 1, wherein the protocol message is a Hello message periodically sent by a master node carrying layer information of the Ethernet ring where the master node is located; and the process of the master node performing fault recovery detection and fault recovery processing by using protocol message interaction comprises after receiving a Hello message sent by the master node itself carrying layer information of the Ethernet ring where the master node is located, the master node determining that a fault on the Ethernet ring where it is located is recovered, blocking the secondary port, and sending out a forward-table updating message carrying layer information of the Ethernet ring where it is located.

9. The method according to claim 1, wherein the protocol message includes one of the following:

a forward-table updating message that is sent by the master node after detecting a fault on the link directly connected to the primary port of the master node and that carries layer information of the Ethernet ring where the master node is located;

a forward-table updating message that carries layer information of the Ethernet ring where the master node is located, and is sent by the master node after receiving a fault notification message carrying layer information of the Ethernet ring where the master node is located;

a forward-table updating message that is sent by the master node after receiving a Hello message sent by the master node itself and that carries layer information of the Ethernet ring where the master node is located; and a forward-table updating message that carries layer information of the Ethernet ring where the master node is located, and is sent by the master node after determining that fault recovery messages, each of which carries layer information of the Ethernet ring where the master node is located, correspond to the same link are received from different ports of the master node belonging to the same layer ring.

10. The method according to claim 9, wherein the process of determining fault recovery messages corresponding to the same link comprises:

determining different fault recovery messages that carry information of the same node as the fault recovery messages corresponding to the same link; or according to topology structure of the intersecting ring network obtained in advance, determining different fault recovery messages that carry information of two nodes on double ends of a link as the fault recovery messages corresponding to the same link.

11. The method according to claim 9, further comprising:
any node in the intersecting ring network receiving a forward-table updating message from a port that carries layer information, and updating the forward table of the port when the layer of the Ethernet ring the port belongs to is the same layer as or an inner layer than the layer indicated by the layer information carried in the forward-table updating message.

12. The method according to claim 1, further comprising:
a master node in the intersecting ring network executing fault protection processing including opening the secondary port and sending a forward-table updating message carrying layer information of the Ethernet ring where the master node is located only when one of the two following situations occur, wherein the two situations include receiving a fault notification message that carries layer information of the current layer ring of the master node, and detecting that a link directly connected to the primary port of the master node is at fault, and wherein the master node is a master node of any layer ring except the most inner layer ring or is a master node of any layer ring in the intersecting ring network; and/or after a node in the intersecting ring network detecting that a link directly connected to its port belonging to any layer ring except the most inner layer ring is recovered, the node setting the port to be blocked, and opening the blocked port only when receiving a forward-table updating message sent by the master node of the current layer ring of the node.

13. An intersecting ring network with arbitrary topology, comprising:

multiple intersected Ethernet rings, wherein the multiple intersected Ethernet rings form an intersecting ring network with arbitrary topology, each Ethernet ring in the intersecting ring network is mapped into a layer, and the layer of the Ethernet ring is one of the layers from the most inner layer to the most outer layer; and each Ethernet ring in the intersecting ring network comprising a master node and multiple transmission nodes, wherein the primary port of the master node is open and the secondary port of the master node is blocked during initial normal operation;

the master node of each Ethernet ring in the intersecting ring network is capable of performing fault detection and fault processing as well as fault recovery detection and fault recovery processing by using one of the two manners containing protocol message interaction and/or detection on links directly connected to the master node;

a node of any Ethernet ring in the intersecting ring network is capable of sending a protocol message carrying layer information of the node's current layer ring:

a transmission node in the intersecting ring network is capable of receiving the protocol message from a port, and forwarding the protocol message through other unblocked ports; and a master node in the intersecting ring network is capable of forwarding the protocol message through other unblocked ports when receiving the protocol message from an outer layer ring through an unblocked port, and capable of performing relevant processing according to the protocol message and not forwarding the protocol message anymore when receiving the protocol message from the current layer ring of the master node, and capable of directly discarding the protocol message when receiving the protocol message from an inner layer ring.

14. The intersecting ring network according to claim 13, wherein each Ethernet ring in the intersecting ring network is mapped into a layer, and the layer of the Ethernet ring is one of the layers from the most inner layer to the most outer layer;

the intersecting ring network further comprises an edge node, and the ports of the edge node belong to different layer rings, wherein the edge node is a node with a port through which a virtual node accesses an Ethernet ring and a network composed of all the inner layer rings of the Ethernet ring in the intersecting ring network is taken as the virtual node of the intersecting ring network; and wherein a node of any layer ring in the intersecting ring network is capable of sending a protocol message carrying information of the current layer ring;

wherein the edge node is capable of receiving the protocol message from one of its ports, selecting another port that is at the same layer as or on an inner layer than the layer indicated by the layer information carried in the protocol message, and forwarding the protocol message from the selected another port.

15. A master node located in an intersecting ring network with arbitrary topology, comprising:

a port processing unit, capable of receiving a protocol message carrying layer information from other nodes, and forwarding the protocol message carrying the layer information through other unblocked ports after receiving a forward notification message; and a protocol message processing unit, capable of obtaining layer information from the protocol message received by the port processing unit, directly discarding the protocol message if it is determined that the master node's current layer ring is an outer layer ring comparing with the layer information, not forwarding the fault notification message and confirming that an Ethernet ring where the master node is located is down, opening a secondary port of the master node and sending out a first forward-table updating message if it is determined that the master node's current layer ring is the same layer ring as the layer information; and sending the forward notification message to the port processing unit if it is determined that the master node's current layer ring is an inner layer ring compared to that of layer ring of the layer information.

16. The master node according to claim 15, wherein the port processing unit is further capable of sending protocol messages in preference to data messages according to the principle that priority of protocol messages is higher than that of data messages when forwarding the protocol message carrying layer information.

17. The master node according to claim 15, wherein the protocol message processing unit is further capable of performing fault protection processing including opening the secondary port and sending the first forward-table updating message carrying layer information of the current layer ring only when one of the two situations occur, wherein the two situations include receiving a fault notification message that carries layer information of the current layer ring, and detecting that a link directly connected to the primary port is at fault.

18. A transmission node located in an intersecting ring network with arbitrary topology and acts as an edge node, wherein the edge node is a node with a port through which a virtual node accesses an Ethernet ring and a network composed of all the inner layer rings of the Ethernet ring is taken as the virtual node of the intersecting ring network;

the transmission node comprising:

a port control unit, capable of receiving a fault notification protocol message that carries layer information and is sent by other nodes from a first port, forwarding the fault notification message carrying layer information through a port corresponding to the port information carried in a forward notification after receiving the forward notification; and a protocol message control unit, capable of obtaining layer information from the fault notification message received by the port control unit, selecting a port that belongs to a layer ring that is the same layer ring as or an inner layer ring than the layer indicated by the layer information carried in the fault notification message from the ports of the transmission node other than the first port, and sending the forward notification that carries information of the selected port to the port control unit.

19. The transmission node according to claim 18, wherein the port control unit is further capable of sending the fault notification message in preference to data messages according to the principle that priority of the fault notification message is higher than that of data messages when forwarding the fault notification message carrying layer information.

20. The transmission node according to claim 18, wherein the port control unit is further capable of setting a port to a blocked state after detecting that a link directly connected to the port belonging to any layer ring except the most inner layer ring is recovered, and opening the blocked port only when receiving a forward-table updating message sent by the master node of the current layer ring of the transmission node.

* * * * *